3,734,875
AEROSOL BIRD REPELLENT COMPOSITION
Stanley H. Sekuler, Silver Spring, Md., assignor to
L & S Associates, Incorporated
No Drawing. Filed June 15, 1971, Ser. No. 153,436
Int. Cl. C08f 45/28, 45/36, 45/34
U.S. Cl. 260—31.2 R                                9 Claims

ABSTRACT OF THE DISCLOSURE

An aerosol composition useful for repelling birds from a given locus comprising polyisobutylene, at least one inert nonpolar organic solvent, and an aerosol propellant, and methods of applying the same to a locus.

BACKGROUND OF THE INVENTION

This invention relates to a highly useful bird repellent. More particularly, the present invention is concerned with the use of a bird repellent formulation which is used in the form of an aerosol and a method for rendering a locus free of birds.

The control of birds is of great concern to farmers, property owners, airplane operators, city managers, etc. For example, the task of deterring birds, such as pigeons, from resting on exposed surfaces such as window sills, roofs, and ledges of buildings has become a problem of major concern. Thousands of dollars are spent each year by property owners, especially in large metropolitan areas, to clean buildings which have been used as resting places for such birds as starlings, pigeons, sparrows, and the like. Birds have also created numerous problems for the farmer. For example, birds aid in the transmission of various livestock diseases, many of which cause the loss of livestock valued in the millions of dollars each year.

Another, more severe problem created by the presence of birds, is the hazard to aircraft when landing and taking off as well as during the flight of airplanes. For example, it is necessary for airports to be kept clear of birds by treating the area with a bird repellent to minimize the hazard of birds flying into the path of aircraft landing at and taking off from airfields. Further, it is also necessary to prevent birds from roosting on airplanes while they are on the ground.

Several chemical formulations are currently available for repelling undesirable pests, e.g., birds, from a particular region, but said products work with varying degrees of success. One or more severe limitations are associated with most of these products, these limitations including cost or inconvenient or time-consuming methods of application of the formulation to a surface, e.g., by brushing, dusting, wiping and dipping procedures. Attempts to improve the methods of applying repellents to a surface in a simple and efficient manner have been unsuccessful up to now.

There thus remains a need for a conveniently applicable, low most, chemical formulation for repelling undesirable pests, e.g., birds, and the present invention quite unexpectedly reveals that this need can be satisfied.

OBJECTS OF THE INVENTION

Specifically, it is the primary object of the invention to provide an effective composition for at least significantly repelling undesirable pests, particularly birds, from a given region, which composition can be easily applied and made available at reasonable prices.

Consistent with this primary object, it is a further object hereof to provide such a composition which contains an inert aerosol propellant thereby facilitating its application and use, which consists essentially of comparatively inexpensive and readily available constituents.

Another important object of the invention is the provision of a bird repellent composition containing compatible ingredients and said composition having a highly satisfactory shelf life.

Still another, most important object of this invention is to provide a novel bird repellent composition which is useful for preventing birds from resting on a particular surface.

It is another object of this invention to provide a method for rendering materials and surface repellent to birds and other undesirable pests. Closely related to this object, but still another important object of this invention is the provision of a method for clearing an area of birds and undesirable pests.

The invention will be better understood and objects other than those set forth above will become apparent after reading the following detailed description of preferred, yet illustrative, embodiments hereof.

DETAILED DESCRIPTION OF THE INVENTION

The composition of this invention comprises (1) a mixture of (a) polyisobutylene and (b) at least one inert organic solvent, and (2) an aerosol propellant.

The active ingredient of this invention is polyisobutylene. This polymer is a clear, quite viscous tacky semi-solid or tough rubbery solid material depending upon the molecular weight of the material. Generally, the polymer material is employed in a molecular weight range of about 35,000 to about 2,100,000 with a molecular weight of about 35,000 being particularly preferred for the practice of this invention. The polyisobutylene has been found to be partciularly useful for its intended purpose due to its unusually desirable tackiness and compatibility properties.

With respect to its compatibility, it is noted only this particular polymer which has outstanding bird repellent properties was found to be compatible with the propellant component of the composition. Ordinarily, polymers structurally similar to the polyisobutylene, e.g., polyisopropylbutylene, have not been found to have as satisfactory a shelf life as the polyisobutylene when formulated with known aerosol propellants.

In order to apply the polyisobutylene to a given surface, it is generally preferred to employ at least one inert nonpolar organic solvent. Suitable inert nonpolar organic solvents include paraffins, olefins, naphthenes, aromatics, etc. Particularly preferred solvents include, e.g., xylene, kerosene, mineral spirits, ethyl acetate, acetone or mixtures thereof.

In order to employ the composition of this invention in a simple and efficient manner, it is essential that the composition contain one or more aerosol propellants. The propellant can be any well-known volatile organic material that exists as a gas at room temperature and may be used as propellant under elevated pressure. Saturated aliphatic hydrocarbons and halogenated saturated aliphatic hydrocarbons having a vapor pressure within the range of about 20 to about 100 p.s.i.g. are typical of the propellants which can be used in the practice of this invention. When a mixture of propellants is employed, such mixture may exist in the form of an azeotrope.

Typical saturated aliphatic hydrocarbons are the lower alkanes, e.g., ethane, propane and butane. Examples of suitable halogenated saturated aliphatic hydrocarbons include the halogenated lower alkanes, e.g., halogenated methanes, halogenated ethanes, and halogenated propanes. Preferred propellants include dichlorodifluoromethane, 1,1,1 - trichloromonofluoromethane, difluoroethane and dichlorotetrafluoroethane. A preferred propellant mixture consists of equal amounts of dichlorodifluoromethane and 1,1,1-trichloromonofluoromethane.

The composition generally contains mixture (1) in an amount of from about 40 to about 60 percent and preferably 50 percent by weight of the total composition. Mixture (1) consists of about 40-60 percent polyisobutylene and from about 60-40 percent by weight of the total composition of at least one inert nonpolar organic solvent.

The proportion of the propellant employed in the composition of this invention should be maintained between about 60 to about 40 percent by weight of the total composition. It is quite desirable for the propellant to comprise 50 weight percent of the total composition.

With respect to the repellent concentrations, it is necessary for the polyisobutylene to be applied to a locus in an amount sufficient to render said locus repellent to birds. Since the concentration can vary depending upon environmental condition such as weather, the type of bird being repelled, and the nature of the terrain, the amount sufficient to render a given surface repellent can vary over wide ranges. Generally, however, it is preferred to provide a given surface with from about 0.01 to about 50 grams of polyisobutylene per square foot of surface. Of course, amounts outside of this range can also be used if desired.

The coverage of the surface to be made repellent need not be total. For example, the surface can be covered with narrow ribbons of the composition of this invention in any geometric pattern such that it becomes difficult, if not impossible, for a bird to avoid contact with the repellent while resting on the surface.

The repellent composition of the present invention can be applied to many different types of surfaces and materials which it is desired to render repellent and protect against the ravages of birds as explained above. For example, the composition can be applied to window ledges, buildings, fences around areas such as airports, airport runways and hangars, etc.

A preferred composition which can be employed in the practice of this invention is set forth in the following illustrative example:

EXAMPLE

|  | Weight |
|---|---|
| Vistanex LM-MS (polyisobutylene of molecular weight of about 35,000 Flory) | 25 |
| Xylene | 10 |
| Mineral spirits | 15 |
| Dichlorodifluoromethane (Propellant 12) | 50 |

After considering the foregoing description and the immediately preceding example, it should be apparent that the objects set forth at the outset of this specification have been successfully achieved.

Accordingly, what is claimed is:

1. An aerosol composition useful for repelling birds from a given locus comprising (1) a mixture of (a) from about 40 to 60 percent by weight of polyisobutylene and (b) from about 60 to 40 percent by weight of at least one inert nonpolar organic solvent, and (2) an aerosol propellant.

2. A composition according to claim 1 comprising from about 40 to 60 percent of mixture (1) and from about 60 to 40 percent of ingredient (2).

3. A composition according to claim 1 wherein said polyisobutylene has a molecular weight range of between about 35,000 and 2,100,000.

4. A composition according to claim 2 wherein said polyisobutylene has a molecular weight range of between about 35,000 and 2,100,000.

5. A composition according to claim 4 wherein said polyisobutylene has a molecular weight of about 35,000.

6. A composition according to claim 1 wherein said aerosol propellant is difluorodichloromethane.

7. A composition according to claim 1 wherein said aerosol propellant is a mixture consisting of equal amounts of difluorodichloromethane and 1,1,1-trichloromonofluoromethane.

8. A composition according to claim 1 wherein said inert nonpolar organic solvent is selected from the group consisting of xylene, kerosene, mineral spirits, ethyl acetate, acetone or mixtures thereof.

9. A composition according to claim 1 comprising 25 weight percent of polyisobutylene having a molecular weight of 35,000 Flory, 10 weight percent of xylene, 15 weight percent mineral spirits, and 50 weight percent of dichlorodifluoromethane.

References Cited

UNITED STATES PATENTS

| 2,825,709 | 3/1958 | Sturm | 260—32.8 A |
| 3,549,574 | 12/1970 | Hawkins | 260—32.8 A |
| 3,096,001 | 7/1963 | Boe | 260—32.8 A |
| 3,332,903 | 7/1967 | Kavalir | 260—32.8 A |

MORRIS LIEBMAN, Primary Examiner

P. R. MICHL, Assistant Examiner

U.S. Cl. X.R.

260—32.8 R, 33.6 PQ; 424—355